United States Patent [19]

Fukuchi

[11] Patent Number: 5,799,107
[45] Date of Patent: Aug. 25, 1998

[54] CONTROL SYSTEM FOR PEN-INPUT TYPE COMPUTER

[75] Inventor: Kunio Fukuchi, Kawasaki, Japan

[73] Assignee: Fujitsu Limited, Kawasaki, Japan

[21] Appl. No.: 950,675

[22] Filed: Oct. 15, 1997

Related U.S. Application Data

[63] Continuation of Ser. No. 251,269, May 31, 1994, abandoned.

[30] Foreign Application Priority Data

May 31, 1993 [JP] Japan ............................ 5-128603

[51] Int. Cl.⁶ .............................. G06K 9/00; G09G 5/22
[52] U.S. Cl. ..................... 382/181; 382/187; 345/179; 345/156
[58] Field of Search ........................... 382/187, 181; 345/156, 179; 395/841, 840, 827

[56] References Cited

U.S. PATENT DOCUMENTS 5,191,622  3/1993  Shojima et al. .................... 382/185
5,267,327  11/1993 Hirayama ........................... 382/161
5,442,376  8/1995  Tannenbaum et al. ............. 345/156

*Primary Examiner*—Thomas G. Black
*Assistant Examiner*—Greta L. Robinson

[57] ABSTRACT

A control system for a pen-input type computer is capable of designating character kinds and character codes for each field in a screen that are registered in advance as an input field attribute of the pen-input type computer which is characteristic of each field. In this case, the combination of recognition candidates for recognizing input hand-written characters and the registered character kinds and character codes can be additionally registered. The input field attribute can be customized on the basis of the combination. Alternatively, when characters are input by moving a plurality of input pens on a screen, the control system is capable of imparting an identification code or a security level data to each input pen, so that data from the input pens can be distinguished from each other.

15 Claims, 25 Drawing Sheets

Fig.1 PRIOR ART

QUOTATION ON HOUSE-MOVING

KANA LETTERS CLIENT'S NAME
MOVING-OUT DATE   YEAR ☐  MONTH ☐  DAY ☐
KANA LETTERS PRESENT ADDRESS 〒
TELEPHONE NUMBER
KIND OF: HOUSE/APARTMENT/CONDOMINIUM  No. ☐  FLOOR ☐
ELEVATOR: YES/NO
TRANSFER DISTANCE ☐ km

DATE OF MOVE-IN  YEAR ☐  MONTH ☐  DAY ☐
NAME OF ATTENDANT

```
esc 1 2 3 4 5 6 7 8 9 0 - ¥ bs
tab Q W B R T Y U I O P @ [ ] ↵
ctrl A S D F G H J K L ; : ] shift
shift Z X C V B N M , . / "
alt        space        alt
```

☐ FLOOR
ELEVATOR: YES/NO

| 0 | 3 | – | 3 | 4 | 5 | 6 |

FINISHED RECOGNITION ERASE CANCELLATION

RECTANGULAR PORTIONS REPRESENT INPUT FIELD

Fig.3

QUOTATION ON HOUSE-MOVING

NAME OF ATTENDANT

KANA LETTERS CLIENT'S NAME

MOVING-OUT DATE: 1993YEAR10MONTH15DAY

DATE OF MOVE-IN

KANA LETTERS PRESENT ADDRESS 〒

KANA LETTERS DESTINATION OF TRANSFER 〒

TELEPHONE NUMBER

```
1 2 3 4 5
6 7 8 9 0
( ) - bs ↵
```

TELEPHONE NUMBER

BUILDING NUMBER
FLOOR

KIND OF: HOUSE/APARTMENT HOUSES
ELEVATOR: YES/NO
TRANFER DISTANCE ☐ km

```
0   3   (   3   4   5   6
FINISHED RECOGNITION ERASE CANCELLATION
0 1 2 3 4 5 6 7 8 9
( ) - bs ↵
```
12S ( RECTANGULAR PORTIONS REPRESENT INPUT FIELDS )

Fig.11

```
ATTRIBUTE NAME
     DATE
COMPLETE/PRIORITY
     COMPLETE
LIST
     ATTRIBUTE, NUMERAL, INDEX
     CODE, YEAR, INDEX
     CODE, DAY OF WEEK, INDEX
     ~~~~~~
     CODE, MONTH, INDEX
```

Fig. 23

```
GROUP PROCESS (APPLICATION)
PARENT PORTION·
CHILD PORTION
ORIGIN POSITION·SIZE
DISPLAY ATTRIBUTE
COLOR, FORE-HAND/DEPTH
POSITION ADJUSTMENT,
DISPLAY/NON-DISPLAY,
OTHERS

┌─────────────────────────┐
    │ EFFECTIVE SECURITY LEVEL│
    │ DATA, x OR MORE/NOT     │
    │ GREATER THAN y          │
    └─────────────────────────┘

COMPONENT KIND:
ICON, WINDOW, FIELD,
BUTTON, MENU
OTHER OPTIONS
```

CONTROL SYSTEM FOR PEN-INPUT TYPE COMPUTER

This application is a continuation of application Ser. No. 08/251,269, filed May 31, 1994, now abandoned.

BACKGROUND OF THE INVENTION

1. Field of the Invention

The present invention relates to a control system for a pen-input type computer which allows an input operation of desired hand-written characters to be efficiently executed by moving one input pen on a screen of the pen-input type computer, and which allows these hand-written characters to be displayed on the screen.

More specifically, it relates to a control system for a pen-input type computer, e.g., a character input system for a pen-input type computer, which can simplify the input operation of desired hand-written characters. Also, it relates to a control system for a pen-input type computer which can improve the security of different kinds of input information transmitted from a plurality of input pens and can distinguish the kinds of information from each other, especially in the case where hand-written characters corresponding to the input information are to be displayed on the same screen.

2. Description of the Related Art

In a character input system of a pen-input computer, a system has been employed which mainly effects a write operation into an input field itself by an input pen. After generating a dedicated input region (input pad) in the vicinity of the field and whenever necessary, executes an input operation and then transfers the input data to the field. In any case, the data hand-written using the input pen is subjected to a character recognition process.

There is also a known software keyboard system (or virtual keyboard system), as typically illustrated in a display example shown in FIG. 1, for example, wherein an input pad 2 and a keyboard 4 are displayed on a display screen 1, and a hand-written character is input using a pen tip of the input pen, or a region displaying a corresponding key is touched by the pen tip, so that the corresponding character code can be input.

However, recognition of the hand-written characters always involves problems such as the degradation of a recognition ratio and recognition errors resulting from the differences between individuals and quality of input devices (or input means). Even when the characters are limited to numerals, a perfect result cannot be easily obtained by one input operation, and several correction operations may need to be carried out.

According to the software keyboard system, almost all the systems accomplish this as a single application or a service sub-system, and always keep all the keys in a state in which they can be displayed and input so as to cope with all the input object fields which change each time.

Accordingly, a large area is occupied on the display screen, and it is necessary to move the software keyboard itself or to change the shift state when the input object fields are changed.

To cope with these problems, the existing system divides the input characters into the numerals, the alphabet, symbols, kana (Japanese syllabary), kanji (Chinese characters), and so forth, and adds an attribute to each of the fields.

In the practical operation, however, these numerals, characters, etc., cannot be clearly divided into the corresponding fields in many cases. In the case of inputting a telephone number, for example, parentheses for enclosing the area code, and a hyphen for separating the numbers, are necessary in addition to the numbers 0 to 9, and the three types of characters or symbols may be mixed.

A large number of characters belonging to the same field can simultaneously be the candidates of character recognition, and may result in the degradation of the recognition ratio and erroneous recognition. To avoid this problem, the number of kinds of input characters must be limited as much as possible. This means that the input fields and the fixed display character strings must be accurately set.

To efficiently execute such pen-input, there is the case where a plurality of pens are used.

In an application where a salesman and a client have a business talk while interposing a pen-input type computer between them, for example, the efficiency of operation would be very low if they alternately input data while exchanging a single input pen. Moreover, the following problem exists.

Namely, an inexperienced or intentional operation by the client could cause program finish or could input the data to unsuitable positions. Such an erroneous operation might decrease the client's desire for the business contract.

Since the data input to the field for the client's input can be made by the salesman, too, rewriting of the client's data due to an erroneous operation might also occur.

In most cases, the data of the business schedule, data of other clients, etc., are also stored in the terminal equipment of the salesman. Therefore, these data could also be lost by an unsuitable operation executed by the client.

When a self-service shop/branch office system of financial or public institutions, such as an automatic transaction machine of a bank, is provided by causing users to directly input the necessary data by utilizing the pen-input type computer, the following problems occur due to the functions of the operating system for operating the pen-input type computer in the same way as described above.

The pen-input type computer for this kind of application mainly uses a graphical user interface, and the operation itself of the operating system or the application program can be operated through icons on the display screen. Therefore, these functions cannot be limited to an effective range only by means of the application program.

An operating system for exclusive use by such a system has been structured in the past. However, such a structure has increased the number of man-hours required for development, and localization of know-how related to the development, has caused fixation of development personnels, and has narrowed the range of the application market. Accordingly, this structure is not practical.

FIG. 2 shows an example of a display screen using a conventional graphical user interface 2'.

In this case, it is assumed that a client is to make an insurance contact by utilizing a display screen, i.e., an insurance contact screen.

As shown in FIG. 2, a client is usually required to operate only application fields 5, a menu scroll button (or menu scroll bar) 6, an input completion button 7 to which an input completion function is allocated, etc., inside an application (application program).

However, various operable regions other than the above-mentioned buttons, etc., are likely to be aligned on the insurance contact screen. For example a system menu button 8 for selecting either one of functions of retrieval, display, option, and auxiliary process is provided on the screen. Further, an application icon 9 used for system management, scheduling, telephone communication, and memorandum is also provided on the screen. Moreover, these operable regions are frequently operated, similar to the dedicated regions for the client. Therefore, the degradation of security of stored data, etc., is unavoidable, owing to complexity of an input operation by the client.

SUMMARY OF THE INVENTION

In view of the above-mentioned problems, the main object of the present invention is to provide a control system for a pen-input type computer, which can reduce the complexity of a correction process for hand-written characters that are input to a pen-input type computer and once recognized by the pen-input type computer.

A further object of the present invention is to provide a control system for a pen-input type computer, in which a simple input operation can be attained in accordance with an attribute, e.g., character kinds and character codes, characteristic of input data that is to be displayed on a screen of a pen-input type computer.

A still further object of the present invention is to provide a control system for a pen-input type computer, which can prevent the degradation of security of input data due to an unsuitable operation that may occur when a plurality of input pens are used during the application of these input pens to a business transaction.

To attain the above objects, the control system for a pen-input type computer according to the present invention includes a designation means for designating character kinds and character codes for each of a plurality of fields constituting the screen, that are registered in advance as an input field attribute of the pen-input type computer, which is characteristic of each of the fields and which can be input to each of the fields.

In this case, the combination of recognition candidates for recognizing the thus input hand-written characters and the thus registered character kinds and character codes can be additionally registered. Further, the input field attribute can be customized on the basis of the combination.

Preferably, the designation means designates whether the input field attribute that is to be registered for a recognition process of the hand-written characters is a complete list, or is to be preferentially processed.

If the input field attribute is a complete list, the number of the recognition candidates is limited so as to improve the speed of the recognition process. On the contrary, if the input field attribute is to be preferentially processed, characters having a low degree of appearance are deleted from a registration list of the input field attribute, so as to curtail the size of a memory region necessary for registering the input field attribute, and also to improve the speed of the recognition process by reducing the number of the recognition candidates with the selected recognition candidates having higher priority.

Further, preferably, an input pad for inputting the hand-written characters is allowed to appear on the basis of the input field attribute that is to be registered for recognition process, and at the same time, the content of the input field attribute is displayed as a software keyboard in the proximity of the input pad, so that an input operation can be arbitrarily carried out by utilizing both of the input pad and the software keyboard as input means.

Further, preferably, every time a change of an input field or an input mode for inputting hand-written characters is effected on the basis of the input field attribute registered for the recognition process, the input field attribute is reported to a general-purpose software keyboard so that the display keys that are to be displayed on the software keyboard are changed or the change of a shift state of the software keyboard is carried out.

Further, preferably, the designation means is constituted by a central processing unit (CPU) of the pen-input type computer.

Alternatively, in the case where hand-written characters are input by moving a plurality of input pens on the same screen, the control system for a pen-input type computer according to the present invention includes a security means for imparting an identification code or a security level data to each of the input pens, so that input information transmitted from the input pens can be distinguished from each other.

Preferably, each of the input pens has a built-in circuit for generating the identification code or the security level data, that functions as the security means. In this case, the pen-input type computer has a detection circuit for detecting the identification code or the security level data generated in the built-in circuit, in addition to another detection circuit for detecting coordinates of the input pens.

Further, preferably, a program for executing registration of the security level data is incorporated in the pen-input type computer, as an input attribute for each screen constituent element, such as menu, icon and field, by selecting corresponding screen constituent elements.

Further, preferably, a program for executing registration of the security level data by a range data expressed by coordinate values on the screen for displaying the hand-written characters is incorporated in the pen-input type computer.

Further, preferably, a program for collating security level data attached to pen-input data by means of the input pens, with security level data related to corresponding constituent elements on the screen that are stipulated by coordinate values acquired by an input operation of the input pens, and for judging effectiveness/invalidity of the pen-input data and the input operation, is incorporated in the pen-input type computer.

In the control system of the present invention, the following six functions (sections (1) to (6)) are fundamentally provided.

(1) The input field attribute for the input mode of the pen-input type computer has a registration system. Therefore, the input attribute and the input mode can be easily added when the user or the application designates the character kinds and the character codes besides the attributes prepared by the system, such as numerals, without the necessity for adding new dictionary data for hand-written character recognition.

Generally, the attribute prepared by the system and the dictionary for recognizing the hand-written characters have a close relationship, and the attribute is divided into files, or indices are put to them. When new attribute is added, indices to the items in the dictionary prepared originally are so generated as to correspond to the designated character kind or character code, as a process on the system side.

When addition designation of the attribute and the mode is made, the articles which had been previously registered and customized are allowed to be designated, and they are recursively processed so that even a slight change of the character code can be easily processed.

(2) The hand-written character recognition process preferentially processes the designated input field or input mode. Therefore, a hand-written character recognition processing unit executes a recognition process by regarding the attribute, which is designated for each field, as the only one or the first candidate.

The items at the time of attribute registration include designations representing whether the designated character kind/code is a complete list, or should be preferentially processed. If the list is a complete list, the candidates for recognition process can be limited, so that the processing speed and the recognition ratio can be improved.

The major proportions of input characters are mostly limited to certain characters. However, when indefinite characters can exist as an exceptional case, those candidates which should be preferentially processed can be designated by the use of the limited characters. In this way, these candidates can be preferentially processed in character recognition.

If this measure is not sufficient, then, a process is executed using the original dictionary for recognition, and in such a case, a higher operational speed and a higher recognition ratio can be expected in the form which is approximate to the form of the complete list. In the case of priority designation, the regions for storing the lists and indices can be saved.

(3) If the software keyboard corresponding to the given attribute is simultaneously disposed and accessorially displayed when the input pad is used, the following functions can be obtained.

There are the cases where the input field is small due to the limitation of the screen design, and where a greater input region is required for inputting/correcting complicated characters. In these cases, the input pad is forced to appear in the proximity of the field and the input operation is carried out in many cases by hand-writing. In such cases, only the characters corresponding to the field attribute or the input mode are combined with the region for recognizing the hand-written characters, and the software keyboard is displayed as a part of the input pad.

When a general-purpose software keyboard is disposed as another application or sub-system, the display key change and the shift state change are made by reporting the present field attribute or the input mode to the application or the sub-system.

In the practical input operation, complete recognition cannot be always made by the single input operation due to the difference of individuals, etc., even in a field which is limited to the numerals, for example. If there are many correction operations, the effect of the pen-input, which is originally designed as the user interface more user-friendly to people than a keyboard, etc., deteriorates, and the pen-input becomes more troublesome to operate, on the contrary.

Accordingly, when the input pad is used for a field having the attribute of numerals and a small number of characters, the hand-writing input operation and the character code input operation can be executed by displaying the software keyboard comprising the combination of the hand-written character recognition region with only the characters corresponding to the attribute.

The keys displayed at this time are so limited as to correspond to the filed attribute. Therefore, a trouble of finding out the keys among a large number of keys and the keys under the shift condition can be eliminated.

When the displayed keys are in the form of the complete list, only the list is used. In the case of priority designation, the display keys are used for most of the input operations, and hand-written character recognition is employed only when the characters not existing on the display keys are input. In this way, the necessity of the troublesome correction operation resulting from the low recognition ratio and erroneous recognition can be reduced, and the pen-input operation can be simplified and its speed can be improved.

(4) When the identification codes or security level data are added to the input pen, the following effects can be obtained.

In other words, the quantity of data and the level of complexity of data that can be added depend on means for accomplishment, and the present invention uses data capable of identifying that at least two kinds of input pens exist, as viewed from the apparatus on the main system side, and the apparatus on the computer main side detects such data simultaneously with the detection of the coordinate values, or in a predetermined cycle or at an arbitrary point of time.

Difference of data between a plurality of pens is handled as the difference of security levels by utilizing a technology which distinguishes a plurality of pens. In an apparatus for detecting the coordinate values of pens by utilizing electromagnetic induction, ultrasonic waves, infrared rays, etc., for example, a plurality of pens can be identified by changing a reactive frequency, by changing the material or the circuit on the pen side.

It is also possible to employ a method which disposes an identification code report circuit inside the pen and reports suitable identification codes or security level data from this circuit to the main system side.

(5) When security level data is added to each region such as an icon on the screen of the main system, the function in this case is as follows. This screen is generally accomplished by the graphical user interface, and is divided into the regions such as icon/window/field/button/menu, etc.

Each of these regions is provided with the attribute such as the position, the size, the group, the character string, and so forth, and the security level data representing whether or not it is operable by a pen in which a given security level is added to such an attribute.

(6) The security level data which each pen has can be added also to the coordinate value data of the pen. As a result, the coordinate value data which the operating system recognizes generally includes contact (down)/non-contact (up) data of the XY coordinate value with the pen and the switch condition data, and the security level data of the pen which generates this data is also added to such a data.

The security level data of each region is collated and effectiveness/invalidity is judged at the point in which the pen input occurs, by any of the functions described above. In this way, in the input process of the operating system or the application, the pen-input data generated is collated with the security level data of the region corresponding to the coordinates, effectiveness/invalidity of the input is judged, and the invalid input is neglected or the display is effected to report that the input is an invalid input.

BRIEF DESCRIPTION OF THE DRAWINGS

The above object and features of the present invention will be more apparent from the following description of the preferred embodiments with reference to the accompanying drawings, wherein:

FIG. 1 is an explanatory view showing a first example of a display screen of a pen-input type computer according to the prior art;

FIG. 3 is an explanatory view showing a display screen of a pen-input type computer used in a first embodiment of the present invention;

FIG. 11 is a view showing an example of an input attribute on the system side in a first embodiment of the present invention;

FIG. 23 is a view showing a data example of each portion in a second embodiment of the present invention;

DESCRIPTION OF THE PREFERRED EMBODIMENTS

Figure 2:
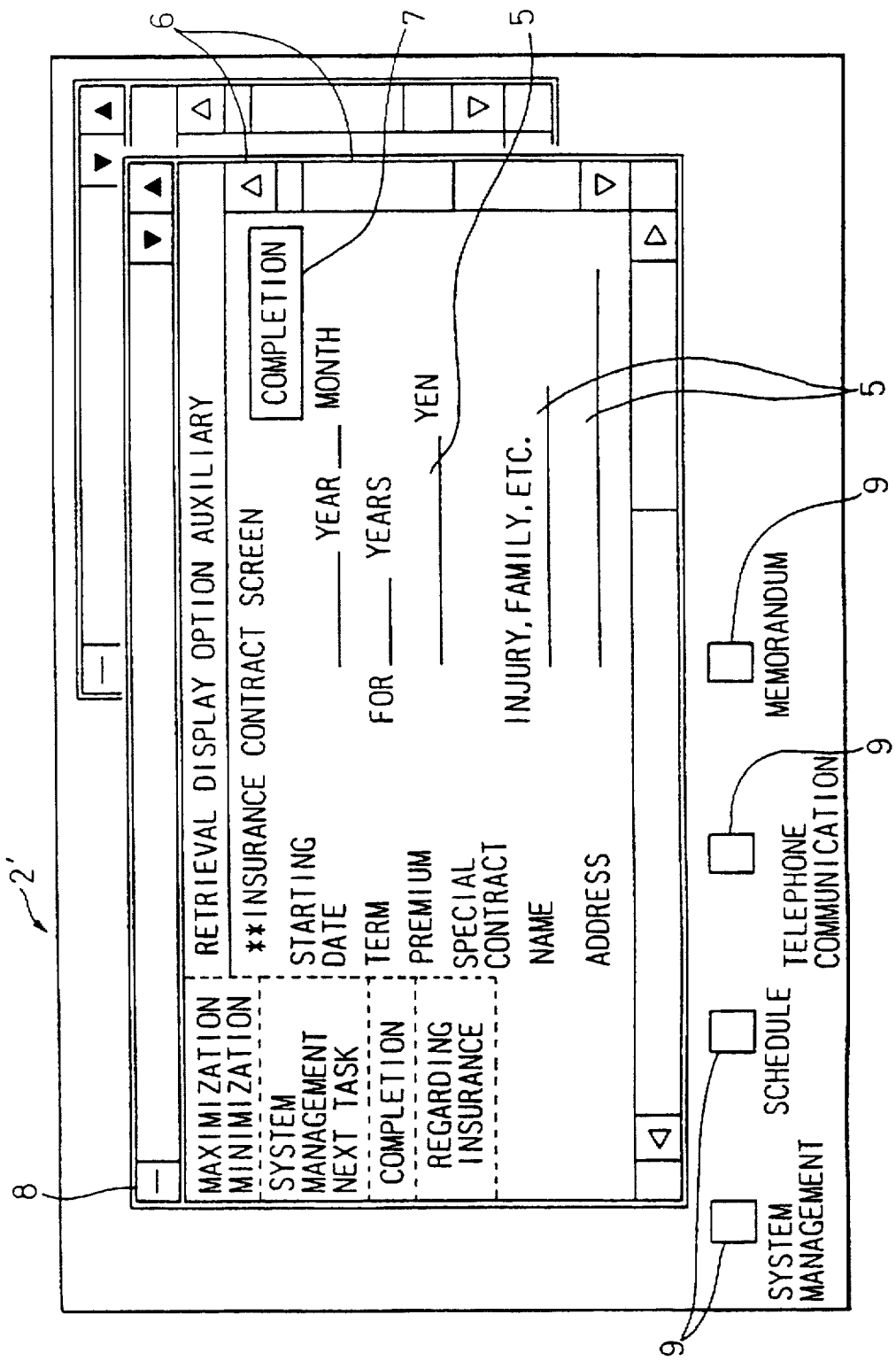
FIG. 2 is an explanatory view showing a second example of a display screen of a pen-input type computer according to the prior art.

Hereinafter, the present invention will be described with reference to some preferred embodiments thereof shown in the accompanying drawings. FIG. 3 shows a display example of a display 10 of a pen-input type computer according to the present invention. The present invention is explained by way of an example, which deals with an estimation or quotation regarding expenses for house-moving.

In this example, there are provided the input portions for the client's name, the data of moving-out, the present address, the address of the destination of transfer, the kind of buildings, the existence of elevator, the transfer distance, and so forth. When the user's telephone number is input, for example, an input pad 12 having the telephone number attribute shown at a lower part of the drawing is displayed. By the way, the rectangular portions on the screen represent the input fields, and the application effects registration of the input attribute and attribute designation of each field when this screen is generated.

When the input pad 12 is displayed in a certain telephone number input field and an input instruction is given by the input pen operation such as double-contact operation of the pen tip to the corresponding portion, a software keyboard 12S comprising the combination of numerals, the parentheses, hyphen, back-space key(bs), and only characters necessary for the telephone number, is displayed with the hand-writing input region in the input pad.

In this case, the operator may effect hand-writing input to the input pad 12 or key touch input using the software keyboard 12S. When the general-purpose software keyboard 14 is displayed in this case, the display can be executed in the same way as in the case of the full keyboard, because all the codes can be the candidates when the input-operation is being carried out to the present address field, for example.

When the field is switched to the telephone number field, the software keyboard 14 having the customized key arrangement shown in FIG. 3 is displayed in accordance with a notification from the system or the application. In this case, the operator makes the key input using the software keys, and direct echo-back is made to the field.

Figure 4:
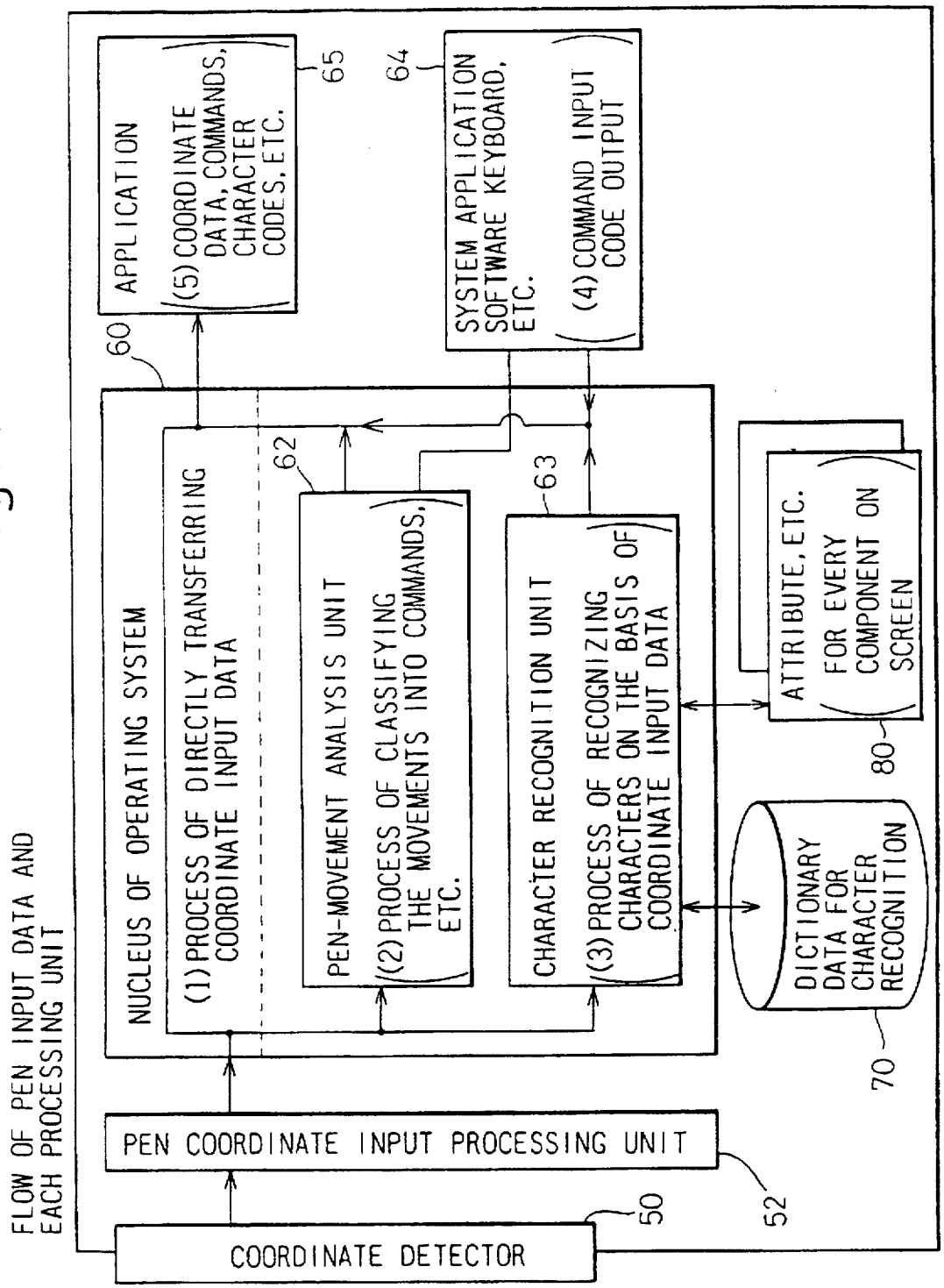
FIG. 4 is a schematic block diagram showing a system configuration of a first embodiment of the present invention.

FIG. 4 is a schematic block diagram showing a system configuration of a first embodiment of the present invention. Hereinafter, any component which is the same as that mentioned before will be referred to using the same reference number.

In this case, the control system for a pen-input type computer of the present invention is realized by an operating system including a CPU having various programs, a system application, and the like. Further, the flow of pen-input data in the operating system is indicated by a plurality of arrows. Also, each of processing units corresponding to each process in the flow of pen-input data is illustrated in the form of block, in addition to these arrows. Preferably, most of these processing units can be realized by the CPU.

In FIG. 4, when desired pen-input data, including characters, is written into an input field in a display screen of the pen-input type computer, coordinate values of the pen-input data are detected by a coordinate detector 50. Further, the thus detected pen-input data are adequately processed by a pen coordinate input processing unit 52, so that the pen-input data can be input to a nucleus of the operating system as formalized coordinate input data.

Further, in FIG. 4, the nucleus of the operating system includes a pen-movement analysis unit 62 which executes the process of classifying the movements into commands from the CPU, and the like; and a character recognition unit 63 which executes the process of recognizing characters on the basis of the coordinate input data. Further, the character recognition unit 63 is adapted to refer to dictionary data for character recognition (reference number 70) and an attribute, etc., for every component of the display screen (reference number 80).

Further, in FIG. 4, in the case where the coordinate input data in the nucleus of the operating system need not be classified, the coordinate input data is directly transferred to an application 65 for treating coordinate data, commands, character codes, and the like.

On the other hand, in the case where the coordinate input data in the nucleus of the operating system must be classified, the coordinate input data is processed by the pen-movement analysis unit 62 and the character recognition unit 63, and transferred to both of the application 65 and a system application 64. In this system application 64, additional input data acquired by a software keyboard, etc., can be processed.

In the flow of pen-input data in FIG. 4, various types of process shown by a plurality of numbers (1) to (5) of FIG. 4 are carried out apparently in parallel, and have a certain interrelationship with each other.

More specifically, the following process indicated by the numbers (1) to (5) will be carried out in order:

(1) A process of directly transferring coordinate input data that is processed by a pen coordinate input processing unit 52;

(2) A process of analyzing the movements, etc., of an input pen used for inputting various data, and classifying pen-input data into various commands, e.g., a command for shifting down the components of the display screen and a command for canceling a specified process;

(3) A process of effecting a character recognition by retrieving dictionary data for character recognition and by comparing the pen-input data with the dictionary data, on the basis of an arrangement of the coordinate input data, and also on the basis of attribute data, etc., of the components of the display screen which is to be input at that time;

(4) A process of reporting corresponding character codes and character kinds of the software keyboard by means of command input and code output (for example, a command input transferred from the pen-movement analysis unit 62, etc.); and (5) A process of executing corresponding procedures in accordance with the coordinate input data, e.g., coordinate data, commands, character codes, and the like, which is received by an application 65.

In this case, the application 65 is capable of receiving various kinds of data including coordinate data, commands, and character codes.

Further, in FIG. 4, the nucleus of the operating system is divided by a dashed line. This dashed line is drawn between the process (1) and the process (2) and (3), to indicate that the process (2) and (3) exists inside the nucleus of the operating system or outside the nucleus of the operating system.

In the system configuration of the first embodiment of the present invention, the process (3) can be simplified and accomplished in shorter time, by storing in advance an input field attribute including character kinds and character codes for each of a plurality of fields constituting the screen, which is characteristic of each of the fields, and by easily retrieving the thus stored attribute by the respective pointers attached to the input field attribute for each field.

Further, the process (3) and (4) can be simplified and accomplished in shorter time, by additionally registering the combination of the thus stored attribute and the character codes corresponding to the movements of an input pen, and by easily customizing the stored attribute.

Figure 5:
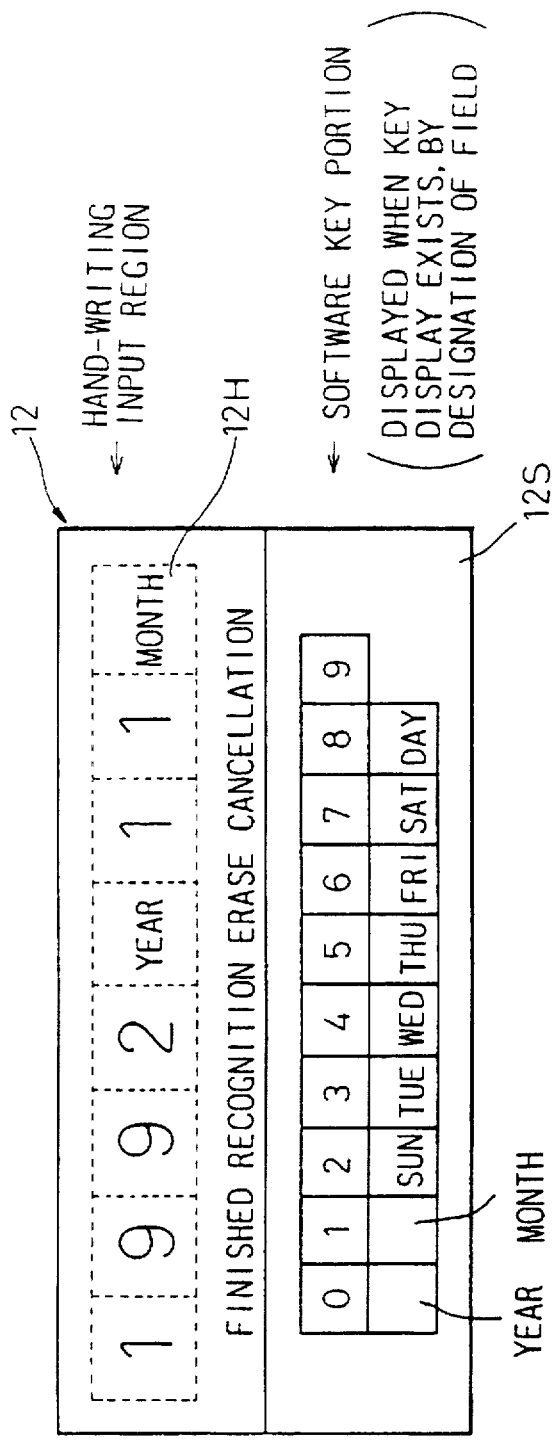
FIG. 5 is an explanatory view showing an input pad of a display screen in a first embodiment of the present invention.

FIG. 5 is an explanatory view showing an input pad of a display screen in a first embodiment of the present invention.

The input pad and the general-purpose software keyboard change to the input pad 12 and the software keyboard 12S corresponding to the move-in date shown in FIG. 5, when the input object field changes to the move-in date.

Figure 6:
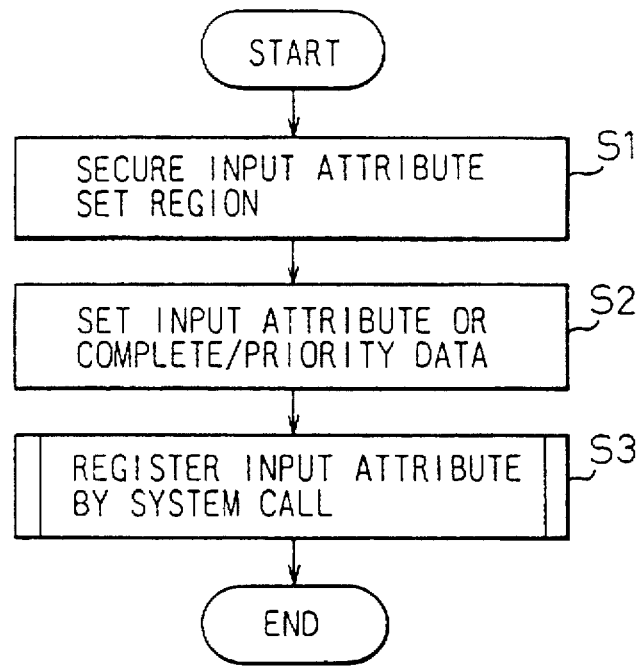
FIG. 6 is a flowchart for explaining a registration method of an input attribute in a first embodiment of the present invention.
Figure 7:
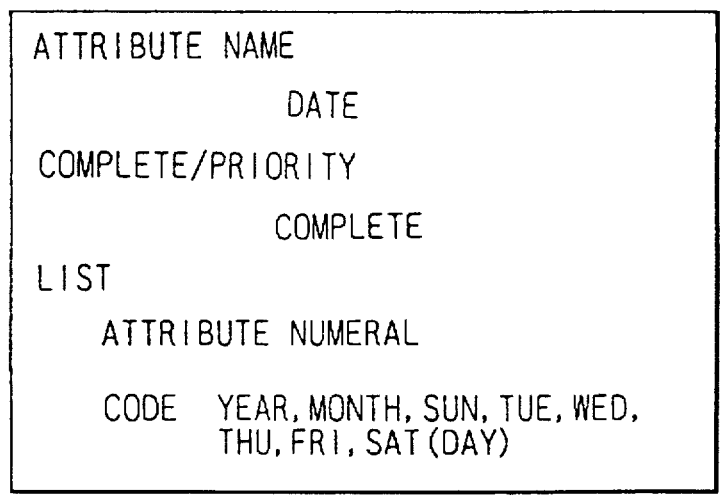
FIG. 7 is a view showing an example of an input attribute in a first embodiment of the present invention.

Registration of the attribute in this embodiment can be made in accordance with the form of utilization shown in FIGS. 6 and 7. A set region of the input attribute is secured as shown in FIG. 6 (Step S1).

Next, whether the input attribute is the complete data or the priority data is determined (Step S2), and then registration of the input attribute is executed by system call on the basis of the result described above (Step S3).

An example of the input attribute in this case may be a code group consisting of the date, complete data/priority data, numerals and other dates, such as year, month and days of the week, as shown in FIG. 7. Here, the term "complete data" represents the case where character codes and characters of the input attribute other than those which are designated in the list cannot be input to the input field having its input attribute. The telephone number and the date, for example, correspond to this case.

In contrast, the term "priority data" represents the state where the character codes and the characters of the input attribute are mostly input to the input field having the input attribute, but the possibility of the input of other characters cannot be denied.

In the field for inputting an arithmetic expression, for example, numerics of 0 to 9 and arithmetic symbols of */+−=( ) will be sufficient in most cases, but there is the case where arithmetic signs such as square root, Δ, integration sign, etc., and variables such as X, Y, etc., are input in some cases. Such a case corresponds to the priority data.

Figure 8:
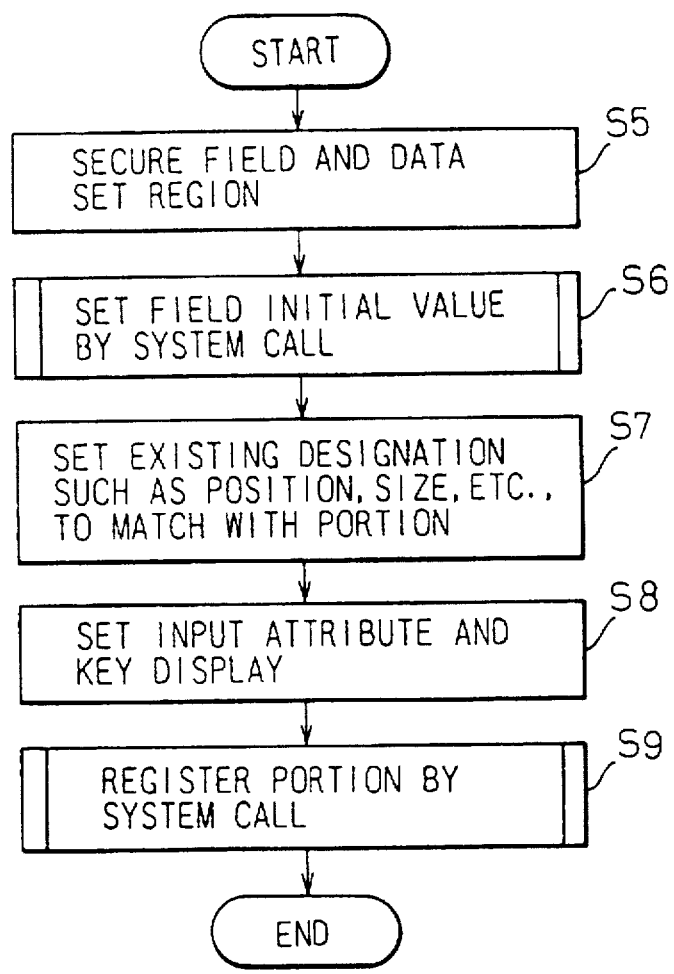
FIG. 8 is a flowchart for explaining a designation method of the registered attribute in a first embodiment of the present invention.

FIG. 8 shows the method of designating the registered attribute. As shown in this flowchart, a set region of the field data is secured (Step S5) and then the field initial value is set by system call (Step S6).

Thereafter, designation on the basis of a data example of each portion such as position, size, color, etc., shown in FIG. 9 that will be hereinafter described, is so executed as to correspond to each portion (Step S7). Next, the input attribute and the key display are set (Step S8), and finally, registration of each portion is executed by system call (Step S9).

Figure 9:
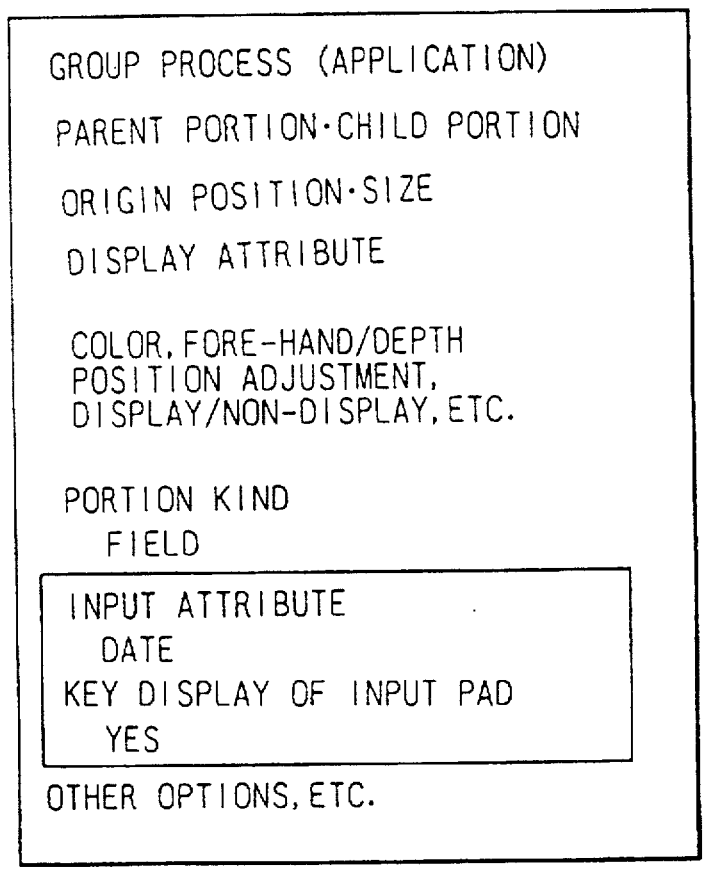
FIG. 9 is a view showing a data example of each portion of an input attribute in a first embodiment of the present invention.

FIG. 9 shows an example of each portion data. In addition to the group process, the parent portion, the child portion, the origin position, the display attribute, etc., the attribute, which is enclosed with a rectangular portion and is related to the input attribute and the presence/absence of the key display of the input pad, are also included.

Figure 10:
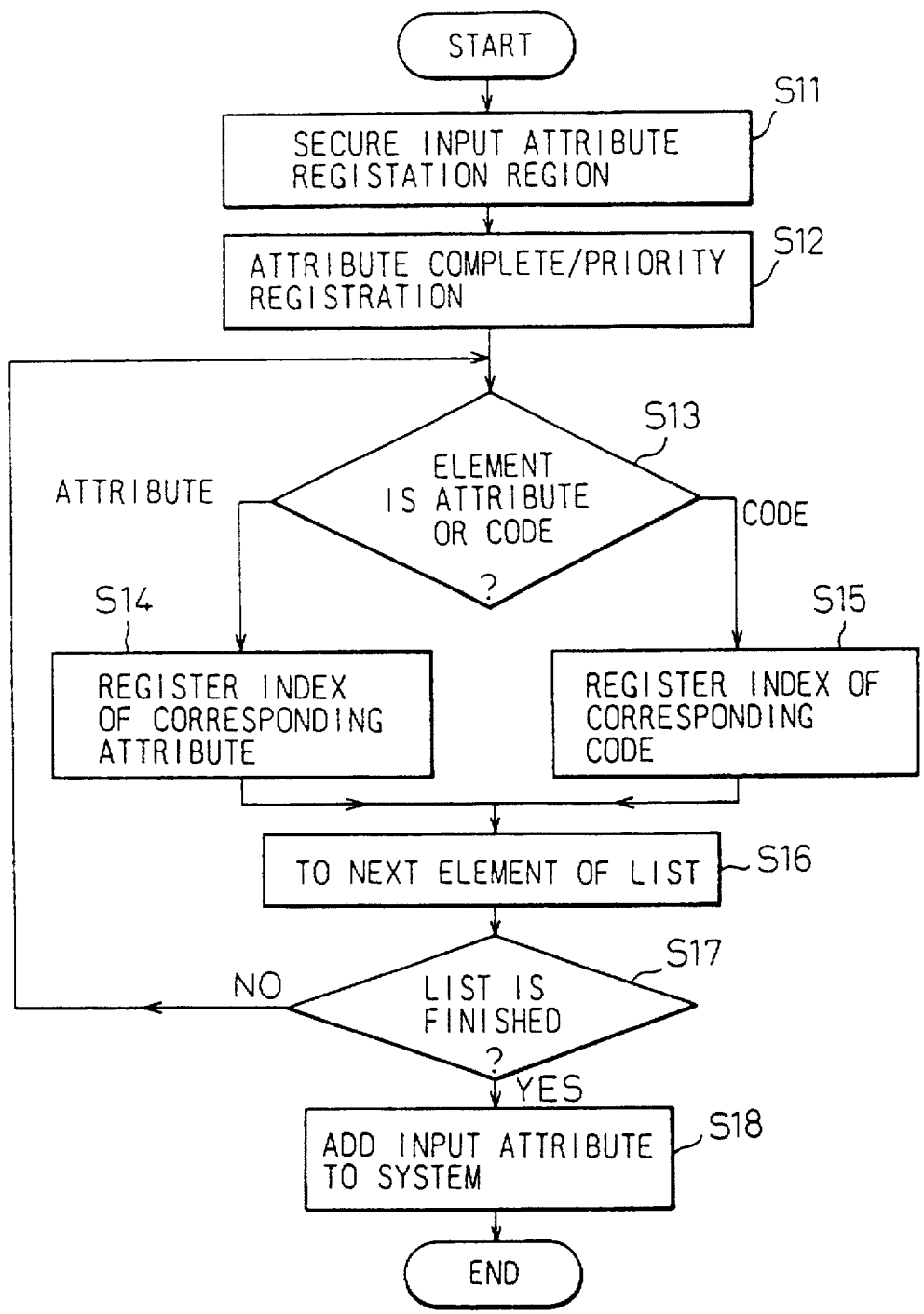
FIG. 10 is a flowchart for explaining a registration process on the system side in a first embodiment of the present invention.

FIG. 10 shows a flowchart for executing a registration process of such an attribute registration on the system side. The input attribute registration region is secured with the start of the flow (Step S11). Next, the complete/priority registration of the attribute name is executed (Step S12).

Next, it is determined whether the element in the list stored in advance is the attribute or the code (Step S13). If the element is the attribute, registration of the index of this attribute is executed (Step S14) and if the element is the code, registration of the index of the code is executed (Step S15).

After both of these registrations are made, the flow proceeds to the next element in the list (Step S16). As a result, it is determined whether or not the list is finished (Step S17). If it is not finished, judgement of the content of the elements in the list is thereafter repeated (Step S13). If the list is finished, the input attribute is added to the system (Step S18), and the flow is finished.

FIG. 11 shows an example of such an input attribute, which includes the attribute name, distinction of complete/priority data, the attribute, numerics, codes and their indices.

Figure 12:
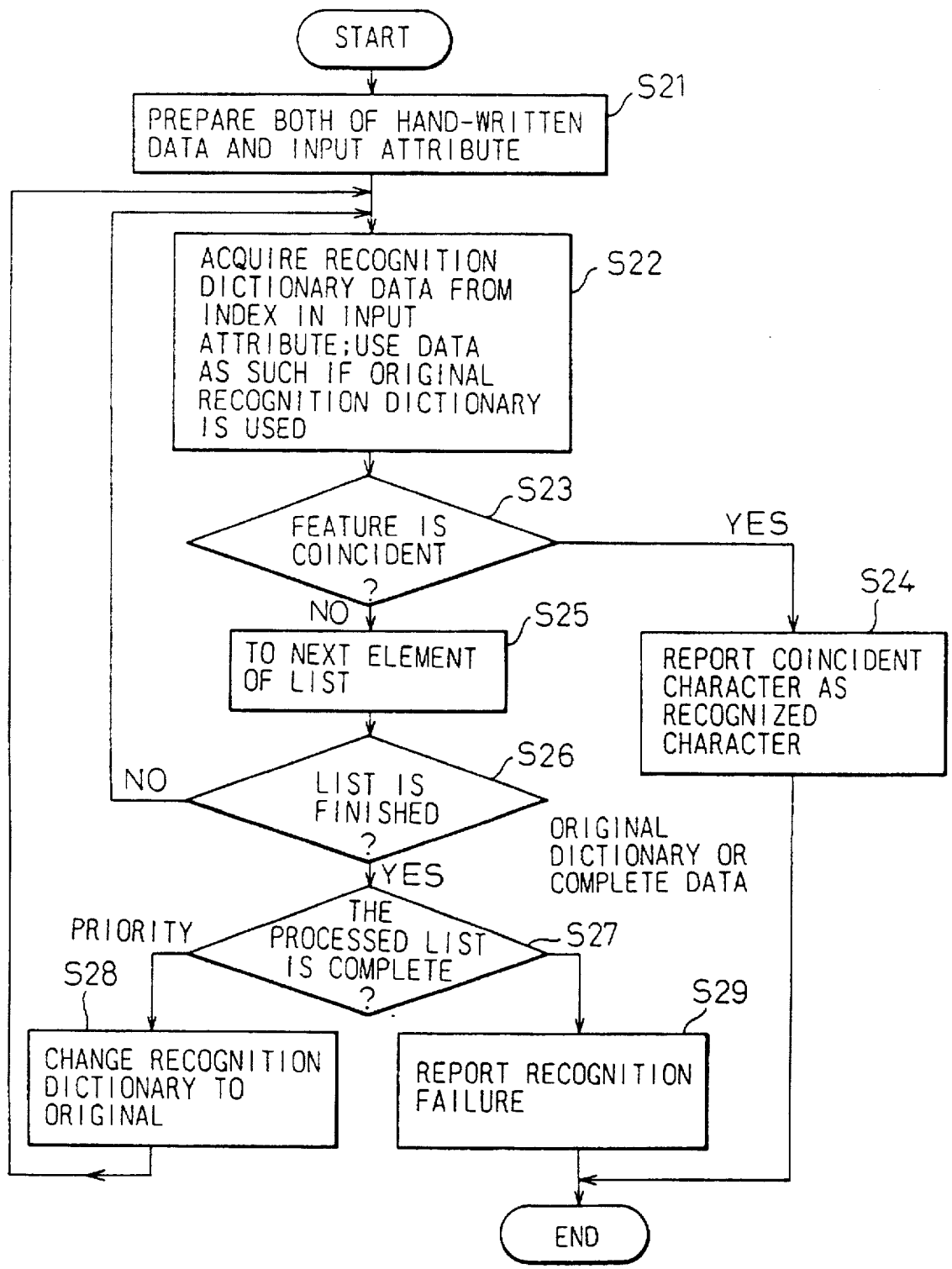
FIG. 12 is a flowchart for explaining the procedures of hand-written character recognition in a first embodiment of the present invention.

The character recognition procedure in this embodiment is executed in accordance with the flowchart shown in FIG. 12. The input pad is displayed so that the operator can easily input the data. The data that is input to the hand-writing input region is subjected to a recognition process on the basis of the data registered as the corresponding data.

According to FIG. 12, both of the hand-written data and the input attribute are prepared with the start of the flow (Step S21). By the way, the items of the attribute registration in this case include designation representing whether the designated character kind/code is the complete list or the priority data.

Next, the recognition dictionary data is acquired from the index in the input attribute, and if it is the original recognition dictionary, the data is as such used (Step S22).

It is determined whether or not the feature of the input character is coincident in accordance with the result of the former result (Step S23), and if it is confirmed that the feature is coincident, the character is reported as the recognition character, and the process is finished (Step S24).

On the other hand, when the feature of the input character is not coincident, the flow proceeds to the next element of the list (Step S25). Next, it is determined whether or not the list to be processed is finished (Step S26). If it is not yet finished, the next recognition dictionary data is acquired (Step S22), and the subsequent flows are repeated.

If the list to be precessed is finished, it is determined whether or not the thus processed list is complete (Step S27). When an object which should be preferentially processed is designated in this judgement, the recognition dictionary is returned to the original dictionary (Step S28) and the next recognition dictionary data are acquired (Step S22). Thereafter, the subsequent flow is repeated.

When the preceding judgement designates the original dictionary or is complete, failure of recognition is reported (Step S29), and the flow is finished.

Figure 13:
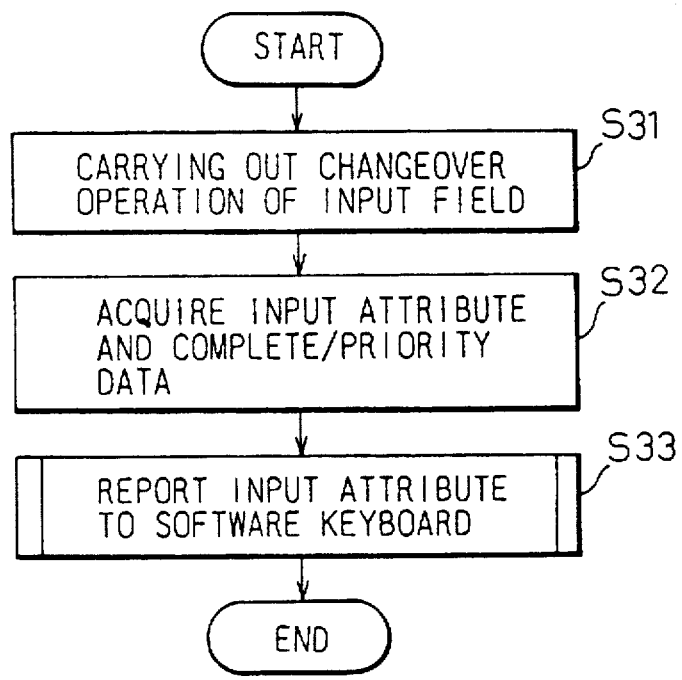
FIG. 13 is a flowchart for explaining the process on the system side which represents the procedures for reporting an input attribute to a software keyboard in a first embodiment of the present invention.

In a modification of this embodiment, the report of the attribute to the general-purpose software keyboard is made by carrying out changeover operation (switching operation) of the input field on the system side as shown in FIG. 13 (Step S31), acquiring the input attribute and the complete/priority data (Step S32), and reporting the input attribute to the software keyboard in accordance with the result thereby obtained (Step S33).

Figure 14:
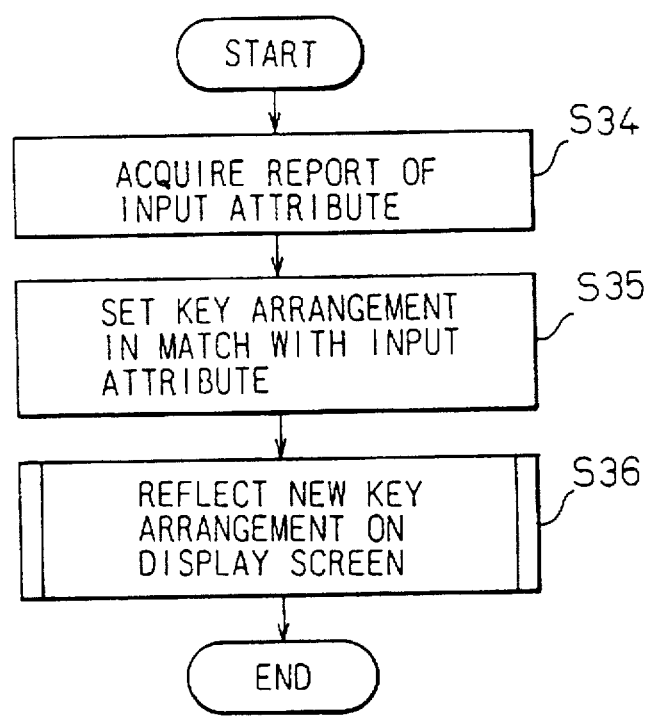
FIG. 14 is a flowchart for explaining the process on a software keyboard in a first embodiment of the present invention.

The process on the software keyboard side receiving such a report comprises acquiring the report of the input attribute (Step S34), setting the key arrangement in accordance with this input attribute (Step S35), and displaying a new key arrangement on the screen on the basis of this result (Step S36) as shown in FIG. 14.

Figure 15:
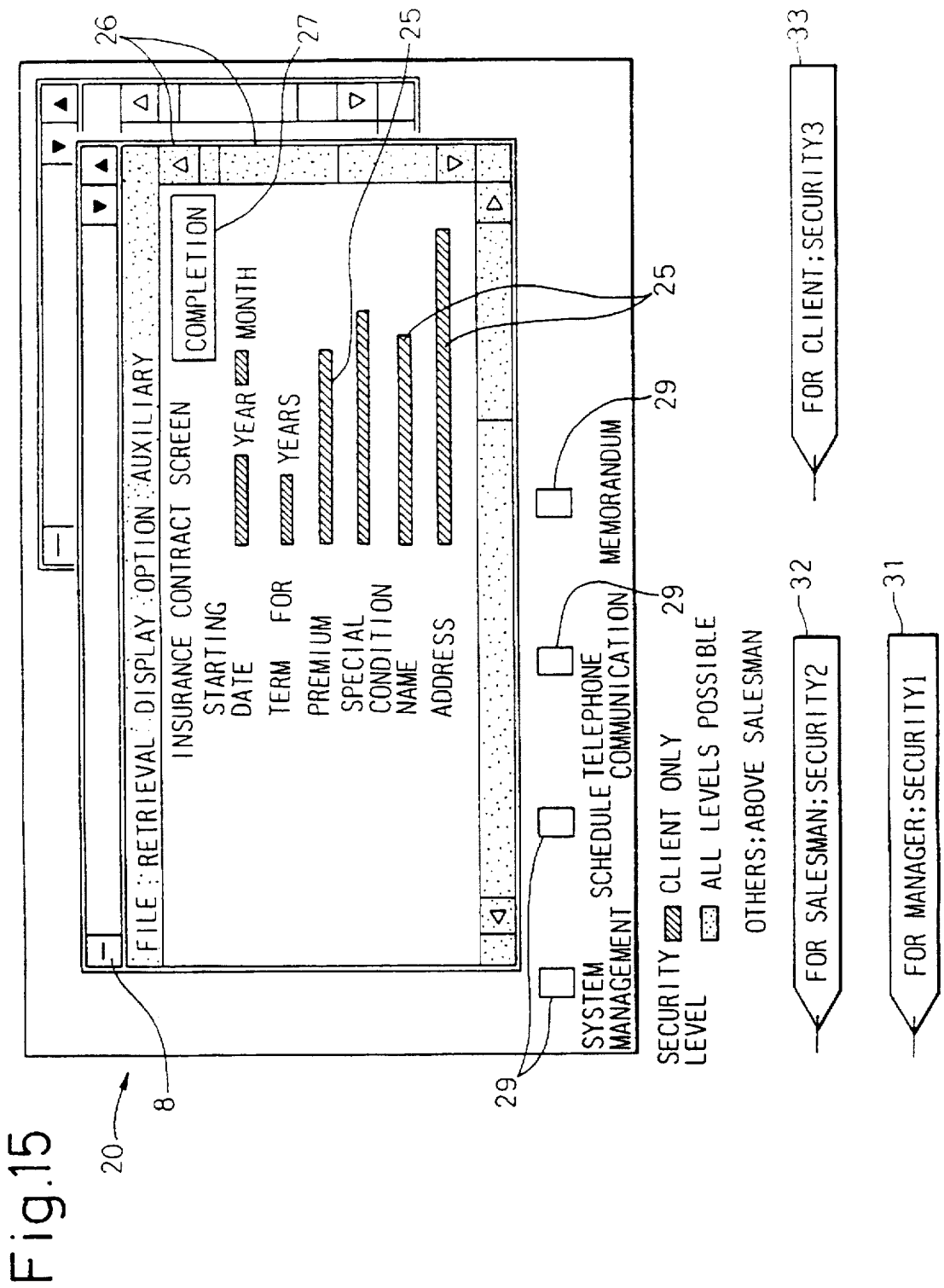
FIG. 15 is an explanatory view showing a display screen of a pen-input type computer used in a second embodiment of the present invention.

FIG. 15 shows the second embodiment of the present invention, and represents the construction capable of improving the security of stored data of the pen input computer.

In this embodiment which illustrates the items relating to the contract of an insurance, the input pens 31, 32 and 33 are divided into three input levels and are allocated to a manager, a salesman and a client, respectively. The input pen for the manager can enter all the data.

In contrast, the input pen for the salesman can handle those data which are directly necessary for the sale or business talk, and the input pen for the client can handle only personal data of the client.

Figure 16:
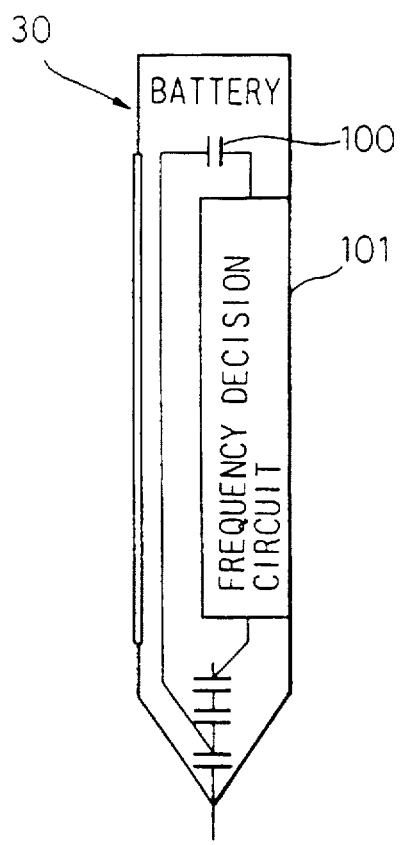
FIG. 16 is an explanatory view showing the construction of an input pen used in a second embodiment of the present invention.
Figure 17:
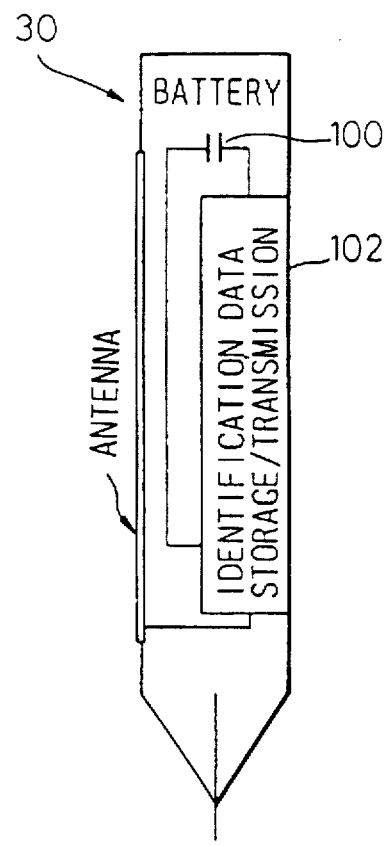
FIG. 17 is an explanatory view showing the construction of a transmission pen of another type of circuit used in a second embodiment of the present invention.
Figure 18:
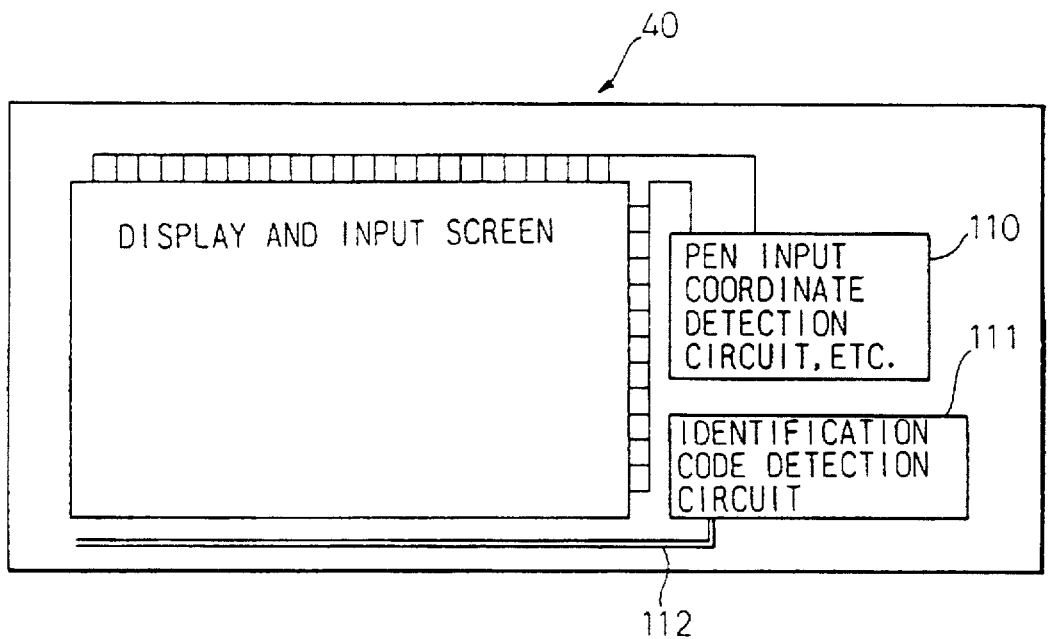
FIG. 18 is an explanatory view showing the construction of the principal portions of a pen-input type computer used in a second embodiment of the present invention.

Such a pen-input type computer can be accomplished by, for example, input pens shown in FIGS. 16 and 17 or by the construction of a pen input computer shown in FIG. 18. The input pen 30 can change the level by changing the oscillation frequency or the modulation frequency by an electronic circuit 101 built in the input pen as shown in FIG. 16, for example.

It can also be accomplished by incorporating a circuit 102 for generating specific data for level discrimination in the input pen, as shown in FIG. 17. By the way, a power supply 100 of the input pen may be a built-in battery or microwaves from the host apparatus can be utilized.

FIG. 18 shows a structural example of the principal portions of the pen-input type computer. This computer has a discrimination code detection circuit 111 corresponding to the input pens shown in FIGS. 16 and 17, and receives an external signal through an antenna 112.

If the input pen shown in FIG. 16 is used, a pen input coordinate detection circuit 110 can receive the discrimination code. Control is carried out in accordance with the level of each input pen on the basis of this reception signal, and security of the stored data can be improved.

The input pen for the manager is only for the managers of the office and for the developers of the system development, and the salesman usually carries two input pens, one for himself and one for the client. These input pens are used by the salesman and the client, respectively.

The basic security level of each portion of the system is above the salesman. Each portion on the screen generated by the application has a respective security level when it is generated.

Figure 19:
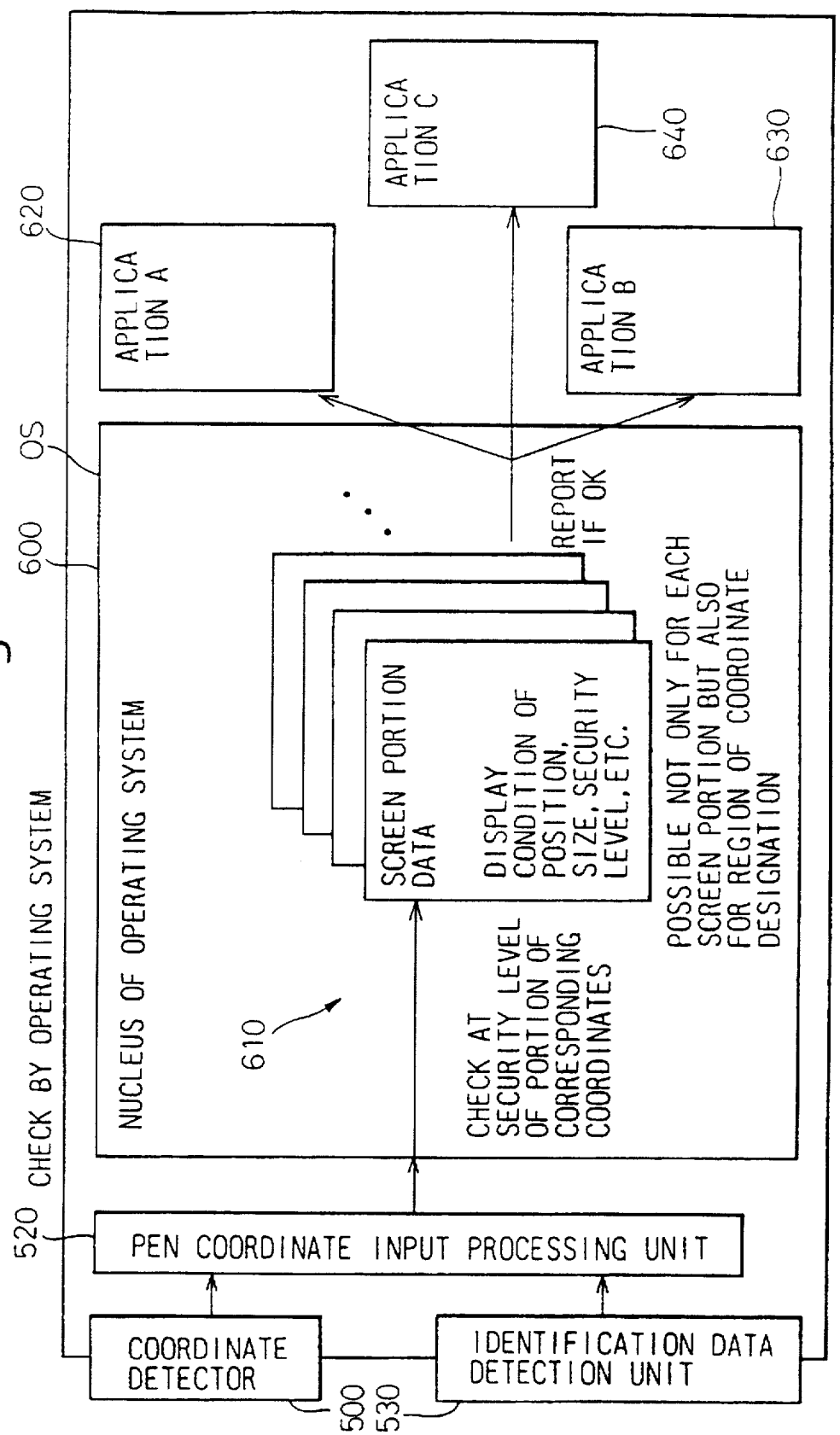
FIG. 19 is a schematic block diagram showing a first system configuration used in a second embodiment of the present invention.
Figure 20:
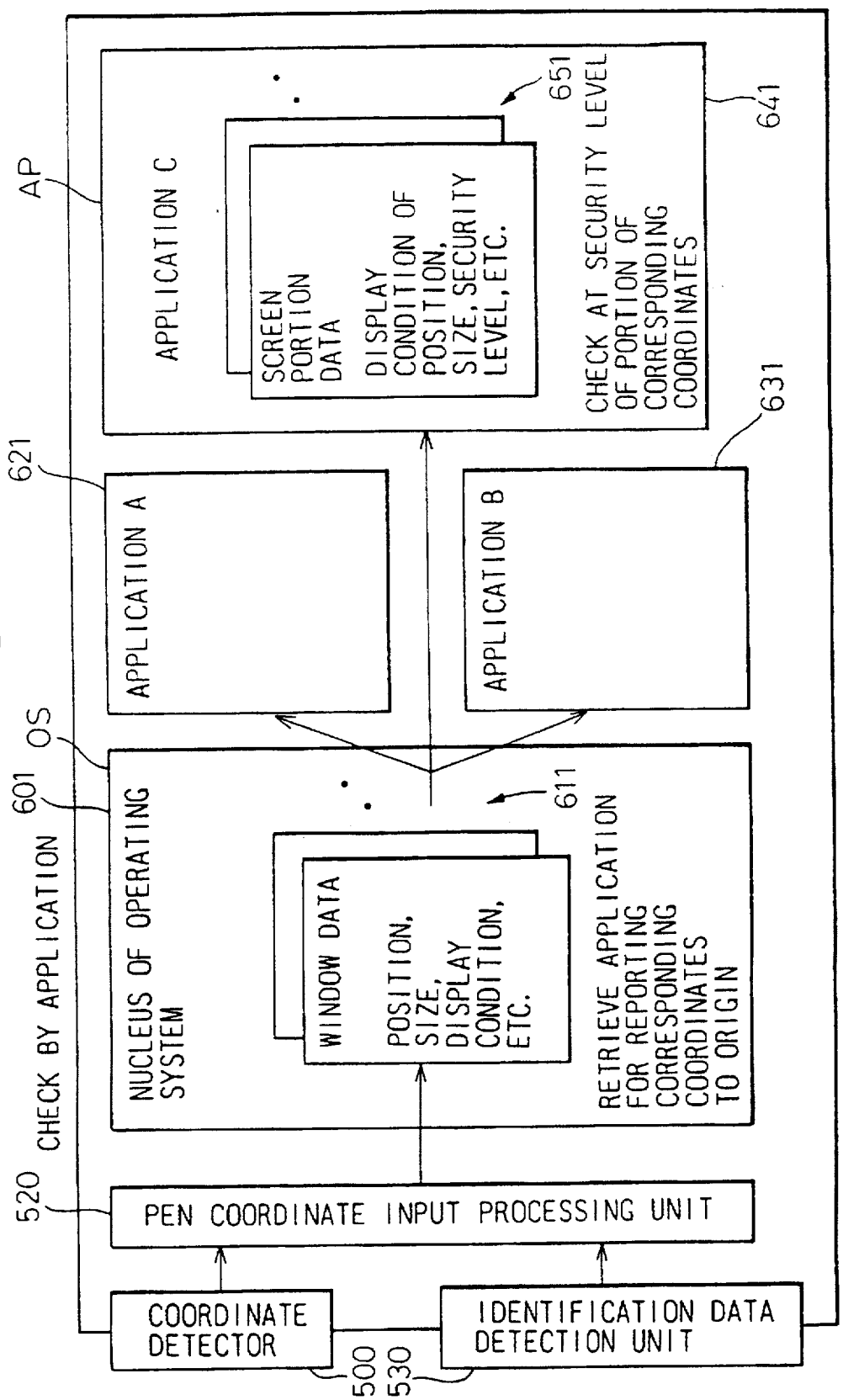
FIG. 20 is a schematic block diagram showing a second system configuration used in a second embodiment of the present invention.

FIG. 19 shows an example of a first system configuration of the second embodiment. In this construction, the security level at a portion of the corresponding coordinates is checked by the operating system OS(600). In contrast, FIG. 20 shows the construction (a second system configuration), wherein the security level is checked by the application AP(641), in place of the operating system OS(601).

Figure 21:
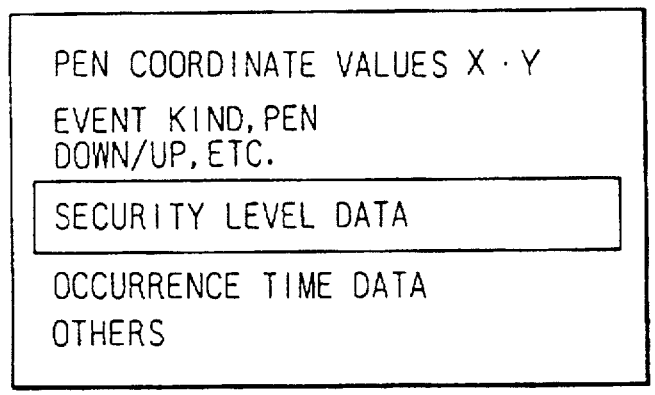
FIG. 21 is an explanatory view showing an example of pen-input event data in a second embodiment of the present invention.

FIG. 21 shows an example of the pen-input event data for executing an event corresponding to each name. The drawing shows that the security level data is included in addition to the pen coordinate values X, Y and the event data.

Turning back to FIG. 15, a dotted portion can be applied from all levels but hatched portions can be operated by the client level. All the other portions excluding the above-mentioned portions can be operated by the level above the salesman. Security level registration in this case is executed in accordance with the flowcharts shown in FIGS. 22 and 23 when each portion is generated on the display screen.

Figure 22:
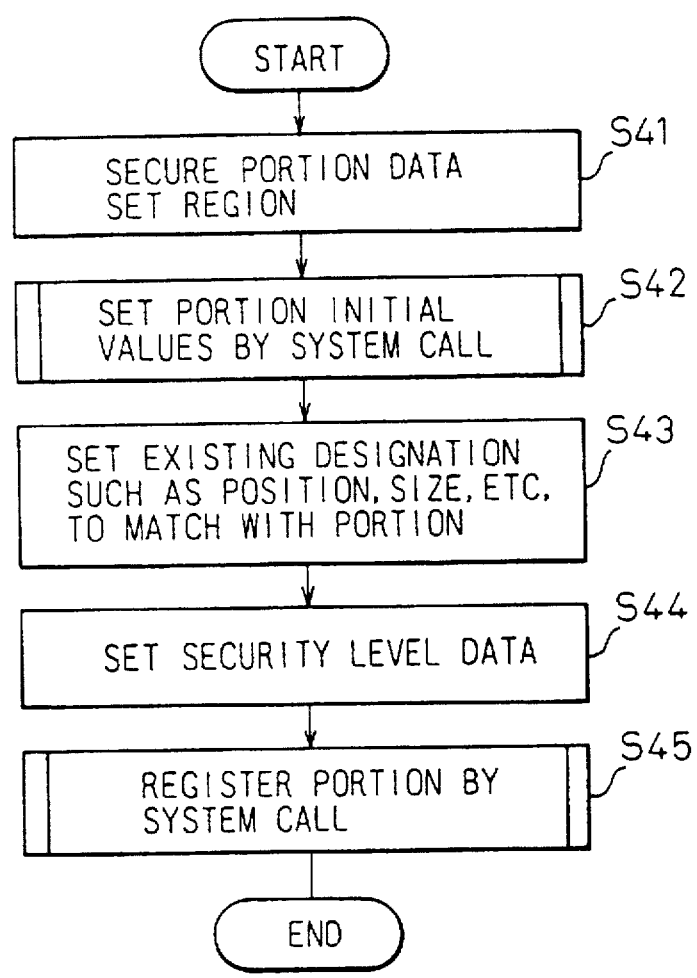
FIG. 22 is a flowchart for explaining a registration process of security level data in a second embodiment of the present invention.

FIG. 22 shows an example in which the security level data is set for each portion. The data setting region for each portion is secured with the start of the flow (Step S41). Next, the initial value of each portion is set by a system call (Step S42).

Thereafter, designation of position, size, etc., that has previously existed is so set as to correspond to each portion (Step S43). Next, the security level data is set (Step S44), and each portion is registered by a system call (Step S45).

FIG. 23 shows a structural example of each portion such as the effective security level data in addition to the group process (application), position of origin, size, display attribute, and so forth.

Figure 24:
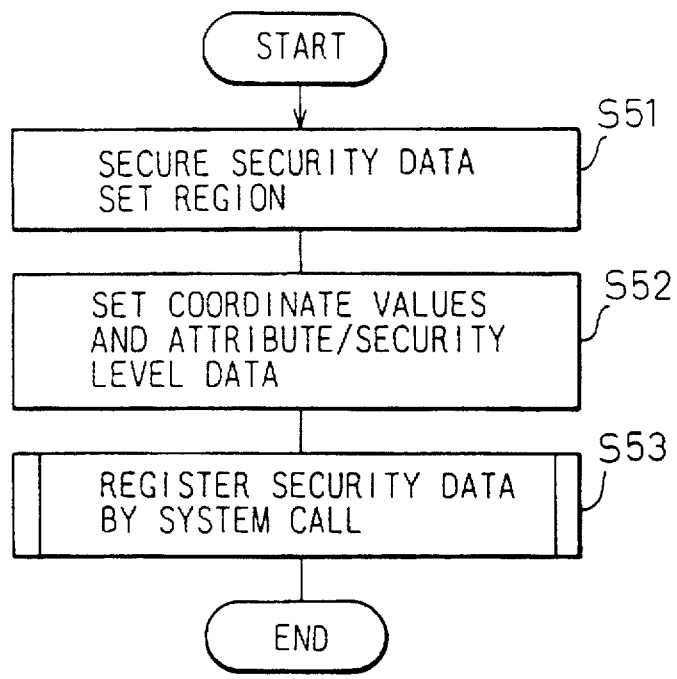
FIG. 24 is a flowchart for explaining a registration process of security level data by utilizing coordinate values in a second embodiment of the present invention.
Figure 25:
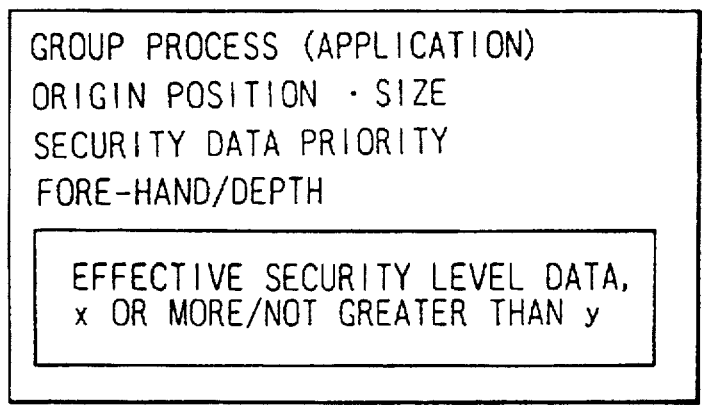
FIG. 25 is an explanatory view showing a data example of coordinate values in a second embodiment of the present invention.

FIGS. 24 and 25 show an example of setting of the security level data by the coordinate value.

Referring to FIG. 24, the security data setting region is first secured (Step S51) and then the coordinate value, the attribute and the security level data are set (Step S52). The security data is registered on the basis of the result, by a system call (Step S53).

As an example of the security data in this case, the effective security level data is set in addition to the group process, the position of origin, security data priority, etc., as typically shown in FIG. 25.

Figure 26:
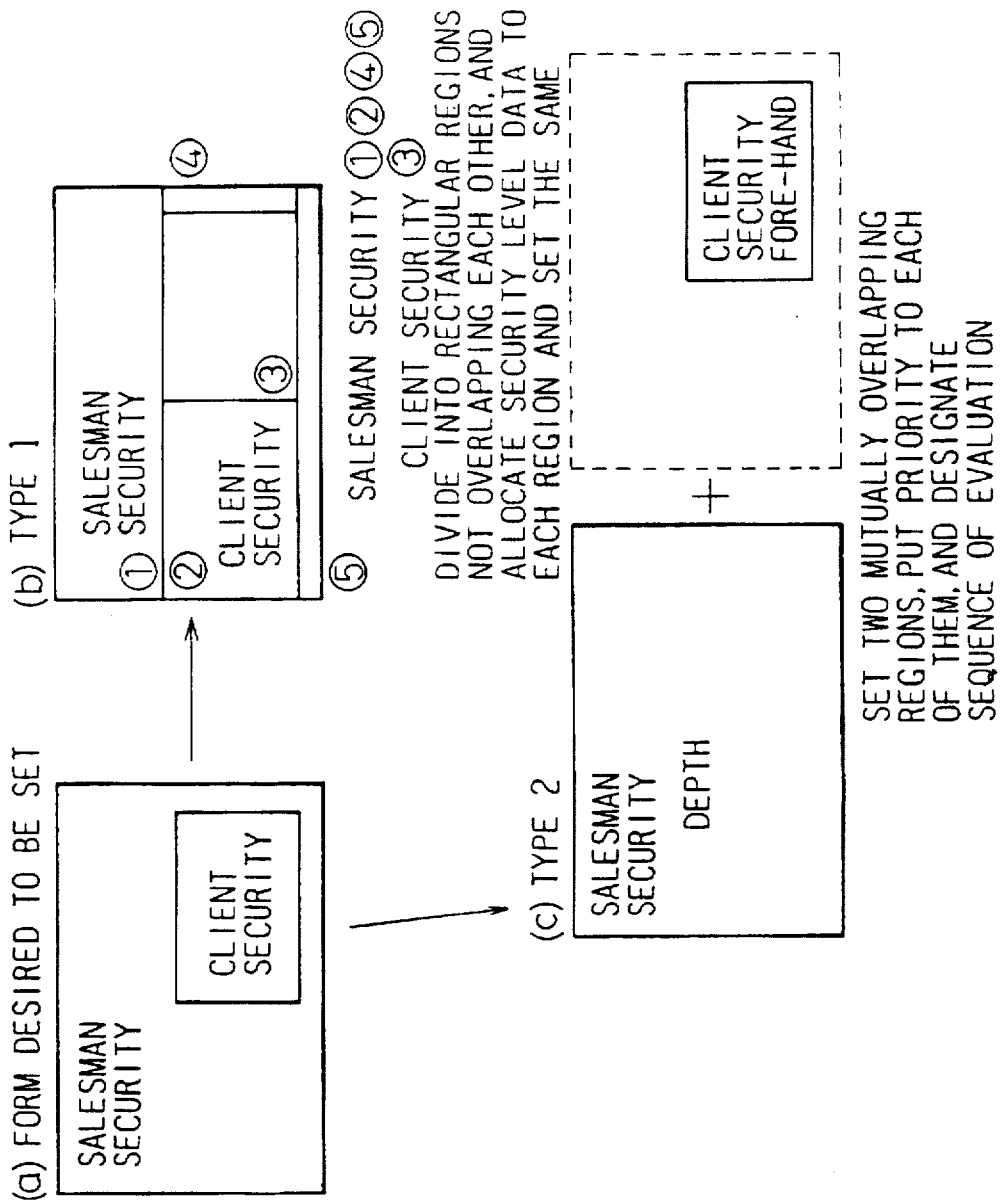
FIG. 26 is an explanatory view showing an example in which each region is set by coordinates, in a second embodiment of the present invention.

FIG. 26 shows an example of region setting by the coordinates. When a region which is desired to be set is a form indicated by (a), the form is divided into rectangular regions not overlapping each other in the type 1 indicated by (b), and after the security level data is put to the corresponding portion, the regions for the salesman and the client are set.

In the case of the type 2 indicated by (c), two regions, which are represented by a solid line and a dashed line and overlap each other, are set, and after priority is applied to each of them, the evaluation sequence is designated.

Figure 27:
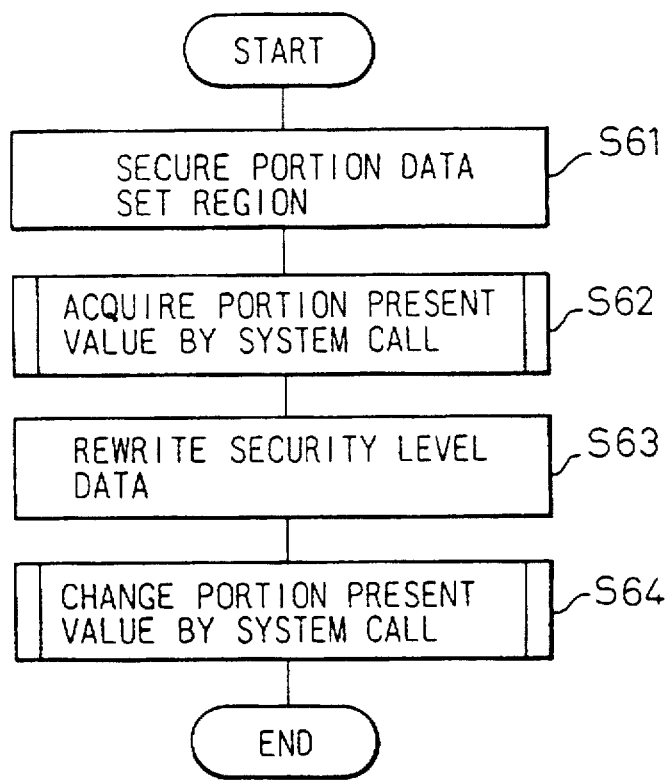
FIG. 27 is a flowchart for explaining the state of the change in a security level in a second embodiment of the present invention.

FIG. 27 shows the flow when the security level is changed. First of all, each portion data setting region is secured (Step S61) and then the present value of each portion is acquired by a system call (S62).

Further, the security level data is rewritten (Step S63), and the present value of each portion is changed on the basis of the result by a system call (Step S64).

The pen-input type computer according to the present invention is used in the following way. The salesman activates the terminal equipment at the client's home and operates the input pen for the salesman until a display screen (FIG. 15) specifically for the client is displayed. Thereafter, the salesman hands over the terminal equipment with the pen for the client.

The client carries out the input operation, etc., to the dotted portion and the hatched portions in FIG. 15, and inputs the condition of the contract, and so forth. At this time, even when the client attempts to operate the other portions by the client's pen, the system does not operate because the operating system and the application check such an operation.

Figure 28:
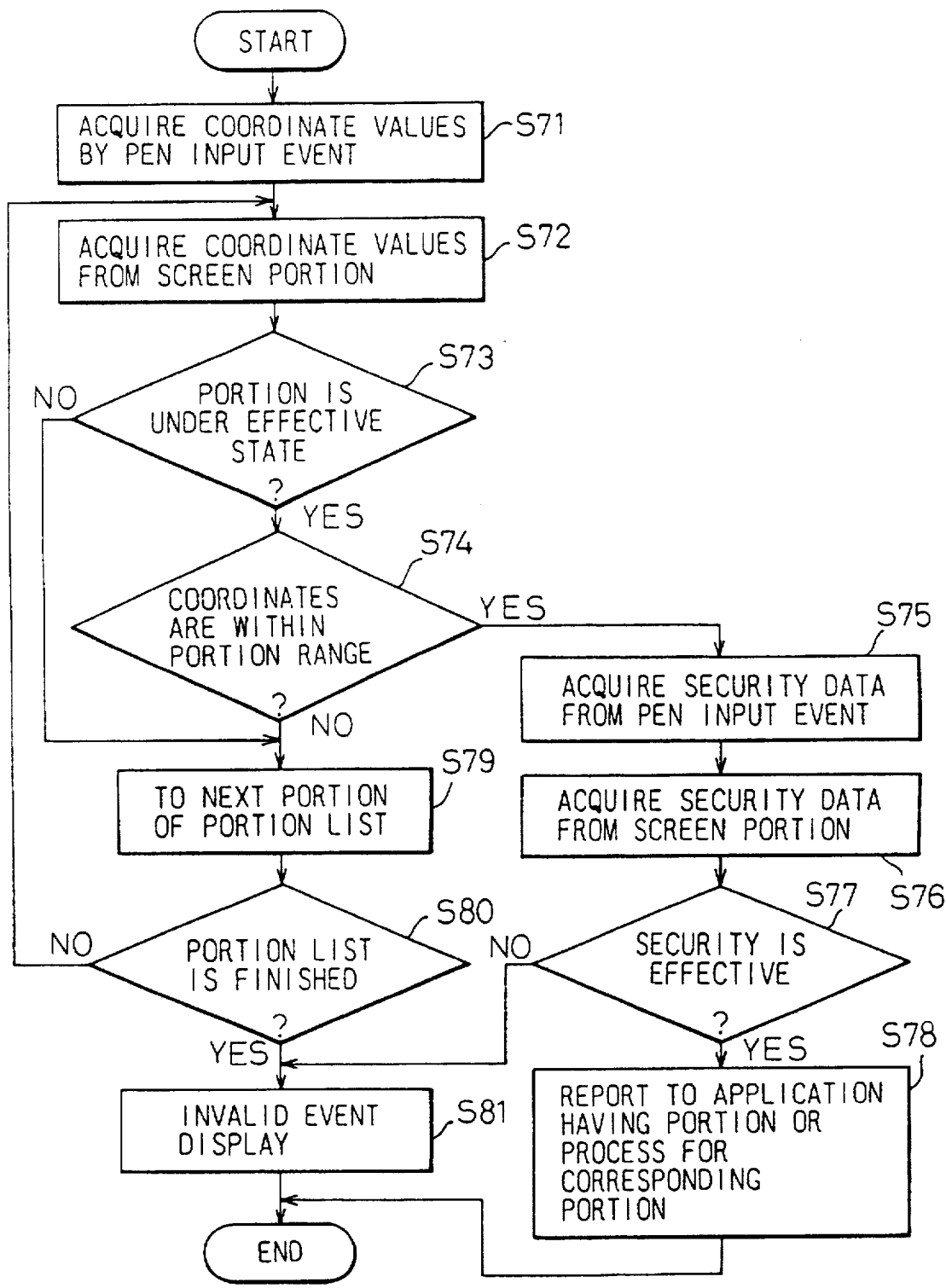
FIG. 28 is a flowchart for explaining a check operation of a security level in a second embodiment of the present invention.

Also, the portions which can be input by the client's pen cannot be operated by the salesman's pen. This check method is shown in the flowchart of FIG. 28. In the case of this embodiment, however, all the operations are possible at the manager level by expanding the security check.

FIG. 28 shows the check flow in the second embodiment of the present invention. First of all, the coordinates values are acquired by the pen-input event with the start of the flow (Step S71). Next, the present value of each portion of the display screen is acquired (Step S72).

It is determined whether or not each portion is under the effective state on the basis of these results (Step S73). If each portion is under the effective state, whether or not the corresponding coordinates are within the range of each portion is judged (Step S74).

If it is within the range, the operator makes a pen operation at the desired portion(s) on the display screen, and the pen-input event is thus generated. The security data so incorporated in this pen-input event, corresponding to the operator's level, is thus acquired (Step S75).

The security data on the pen side functions as a key. On the other hand, the other security data, in which it is established which security level data of the pen-input event for each portion of the display screen may be usable or operable in response to the key, is acquired from the screen side (Step S76).

The security data at these screen portion functions as a lock. It is determined whether or not the security data is effective on the basis of the collation result of both of the security data from the pen side and those from the screen side (Step S77). If it is effective, a report is made to the application controlling each portion, or the process corresponding to the portion is executed (Step S78).

If each portion is found invalid in the judgement as to whether each portion is effective (Step S73), the movement to the next portion of each portion list is executed (Step S79). Next, it is determined whether or not the portion list is finished (Step S80). If it is finished, the flow ends by displaying that it is an invalid event (Step S81).

If it is not finished, the steps after the acquisition of the coordinate value of each portion of the display screen (Step S72) are executed. By the way, if the result is not effective in the judgement as to whether or not the security is effective (Step S77), too, an invalid event is displayed (Step S81) and the flow is finished.

In the display screen of this embodiment, once the input operation of the client is completed and a button representing this completion is depressed, the content cannot be changed by raising the security level and using the pen for the salesman or the client, and only display and look-up can be made. To change the content, the input pen for the manager is necessary.

When the present invention is employed, the process speed and the recognition ratio can be improved by limiting the recognition candidates in the case of hand-written character recognition. In the case of the input pad and the independent keyboard system, the input operation is carried out by primarily using the software keys disposed with the hand-writing input region, and the operations for sorting out the object keys or switching the shift state can be eliminated. Accordingly, the input operation can be sped up and the number of correcting operations due to recognition errors can be reduced.

When the security system for the pen-input type computer using the pen equipped with the identification codes is used, it is possible to prevent illegal change of the data and the outflow of client's data even when the client is allowed to operate the terminal equipment, which the salesman of the insurance company or the bank takes around. Accordingly, the client can be allowed to freely operate the terminal with reference to the data of the interest of the deposit or the loan to his satisfaction and in this way, business opportunities can be improved, and reliability to the salesman or to the company can be further improved.

Similarly, when the present system is introduced when introducing the pen-input system terminals into self-service shops or offices, it is not necessary to develop an exclusive system for limiting the operations by the clients, and the cost of development can be reduced. Further, since the same operating system can be used for development and for operation, development and operation efficiency can be improved and quick counter measure can be taken to the introduction of novel client services.

While the present invention has been described as related to the preferred embodiments, it will be understood that various changes and modifications may be made without departing from the spirit and the scope of the invention as hereinafter claimed.

I claim:

1. A control system for a pen-input type computer, which allows hand-written characters to be input by moving at least one input pen on a screen, and which allows said hand-written characters to be displayed on said screen;
   wherein said control system comprises a designation means for designating character kinds and character codes for each of a plurality of fields constituting said screen, that are registered in advance, as an input field attribute of said pen-input type computer which is characteristic of each of said fields and which can be input to each of said fields;
   wherein a combination of recognition candidates necessary for recognizing the thus input hand-written characters and the thus registered character kinds and character codes as said input field attribute can be additionally registered;
   wherein said input field attribute can be customized on the basis of said combination;
   wherein said designation means is constituted by a central processing unit of said pen-input type computer;
   wherein said designation means is adapted to designate whether said input field attribute that is to be registered for a recognition process of said hand-written characters is a complete list, or is to be preferentially processed;
   wherein, in the case in which said input field attribute is a complete list, the number of said recognition candidates is limited so as to improve the speed of said recognition process; and
   wherein, in the case in which said input field attribute is to be preferentially processed, characters having a low degree of appearance are deleted from a registration list of said input field attribute, so as to curtail the size of a memory region necessary for registering said input field attribute, and also to improve the speed of said recognition process by reducing the number of said recognition candidates with the selection of recognition candidates having higher priority among all the recognition candidates.

2. A control system as set forth in claim 1, wherein an input pad used for inputting said hand-written characters is allowed to appear on the basis of said input field attribute that is to be registered for the recognition process of said hand-written characters, and at the same time, the content of said input field attribute is displayed as a software keyboard in the proximity of said input pad, so that an input operation can be arbitrarily carried out by utilizing both of said input pad and said software keyboard as input means.

3. A control system as set forth in claim 1, wherein an input pad used for inputting said hand-written characters is allowed to appear on the basis of said input field attribute that is to be registered for the recognition process of said hand-written characters, and at the same time, the content of said input field attribute is displayed as a software keyboard in the proximity of said input pad, so that an input operation can be arbitrarily carried out by utilizing both of said input pad and said software keyboard as an input means.

4. A control system as set forth in claim 1, wherein, every time when the change of an input field or an input mode for inputting hand-written characters is effected on the basis of said input field attribute registered for the recognition process of said hand-written character, said input field attribute is reported to a general-purpose software keyboard so that the change of display keys that is to be displayed on said software keyboard or the change of a shift state of said software keyboard is carried out.

5. A control system as set forth in claim 2, wherein, every time when the change of an input field or an input mode for inputting hand-written characters is effected on the basis of said input field attribute registered for the recognition process of said hand-written character, said input field attribute is reported to a general-purpose software keyboard so that the change of display keys that is to be displayed on said software keyboard or the change of a shift state of said software keyboard is carried out.

6. A control system as set forth in claim 3, wherein, every time when the change of an input field or an input mode for inputting hand-written characters is effected on the basis of said input field attribute registered for the recognition process of said hand-written character, said input field attribute is reported to a general-purpose software keyboard so that the change of display keys that is to be displayed on said software keyboard or the change of a shift state of said software keyboard is carried out.

7. A control system as set forth in claim 1, wherein said designation means is constituted by a central processing unit of said pen-input type computer.

8. A control system for a pen-input type computer, which allows hand-written characters to be input by moving a plurality of input pens on the same input plane of a screen, and which allows said hand-written characters to be displayed on said screen;
   wherein said control system comprises a security means for imparting an identification code or a security level data to each of said input pens, so that input information transmitted from said input pens can be distinguished from each other; and
   wherein a program for collating security level data added to pen-input data by using said input pens, with security level data related to corresponding constituent elements on said screen that are stipulated by coordinate values acquired by an input operation of said input pens, and for judging the effectiveness of said pen-input data and said input operation, is incorporated in said pen-input type computer.

9. A control system as set forth in claim 8, wherein each of said input pens is equipped with a built-in circuit for generating said identification code or said security level data, that functions as said security means, and wherein said pen-input type computer has a detection circuit for detecting said identification code or said security level data generated in said built-in circuit, in addition to another detection circuit for detecting the coordinates of said input pens.

10. A control system as set forth in claim 8, wherein a program for executing registration of said security level data is incorporated in said pen-input type computer, as an input attribute for each of screen constituent elements including menu, icon, and field, by selecting the corresponding screen constituent elements.

11. A control system as set forth in claim 8, wherein a program for executing registration of said security level data by a range of data expressed by coordinate values on said screen for displaying said hand-written characters is incorporated in said pen-input type computer.

12. An apparatus for inputting hand-written characters, comprising:

- an input pad which is displayed on a screen and is used for inputting various input items corresponding to said hand-written characters by moving at least one input pen on said input pad;
- a software keyboard having a plurality of keys corresponding to a plurality of characters, which is displayed on said screen and is used for inputting desired characters corresponding to said input items by selecting the corresponding keys from said software keyboard with said at least one input pen;
- each of said characters corresponding to each of said input items being arranged to be displayed on said software keyboard; and
- only characters related to character kinds which are necessary for inputting said input items being arranged to be displayed on said software keyboard.

13. An apparatus for inputting hand-written characters as set forth in claim 12, wherein when it is necessary to input at least one character which is not displayed on said software keyboard, said character which is not displayed on said software keyboard is input by carrying out hand-written operations for said character on said input pad.

14. An apparatus for inputting hand-written characters, comprising:

- a software keyboard having a plurality of keys corresponding to a plurality of characters that are to be input, which is displayed on said screen and is used for inputting desired characters corresponding to input information by selecting the corresponding keys from said software keyboard;
- each of said characters corresponding to said information being arranged to be displayed on said software keyboard; and
- only character kinds related to said characters which are necessary for inputting said input information being arranged to be displayed on said software keyboard.

15. An apparatus for inputting hand-written characters, including a plurality of input pads which are displayed on a screen and are used for inputting various input items corresponding to said hand-written characters by moving a plurality of input pens on said input pads, comprising:

- means for receiving an identification code sent from a given input pen and for comparing said identification code with a reference identification code stored in advance; and
- means for defining a security level for said given input pen corresponding to said identification code, on the basis of a result obtained by comparing said identification code with said reference identification code, wherein one of said input pads in which said hand-written characters can be input by using said given input pen, and at least one of said input pads in which said hand-written characters cannot be input, are established in accordance with the defined security level.

* * * * *

UNITED STATES PATENT AND TRADEMARK OFFICE
CERTIFICATE OF CORRECTION

PATENT NO.:    5,799,107
DATED     :    August 25, 1998
INVENTOR(S):   Kunio FUKUCHI It is certified that error appears in the above-identified patent and that said Letters Patent is hereby corrected as shown below:

Title Page, [54], change the title to --CONTROL SYSTEM FOR PEN-INPUT TYPE COMPUTER HANDLING MULTIPLE COMMAND RECOGNITION INPUTS FOR A PLURALITY OF HANDWRITTEN CHARACTER PATTERNS--.

Title Page, [56], insert the following references:

| | | | |
|---|---|---|---|
| 5,247,137 | 09/1993 | Epperson | 178/18 |
| 5,150,424 | 09/1992 | Aguro et al. | 382/13 |
| 5,010,579 | 04/1991 | Yoshida et al. | 382/13 |
| 5,420,943 | 05/1995 | Mak | 382/313 |
| 5,113,452 | 05/1992 | Chatani et al. | 382/13 |

Col. 1, lines 1-2, change the title to --CONTROL SYSTEM FOR PEN-INPUT TYPE COMPUTER HANDLING MULTIPLE COMMAND RECOGNITION INPUTS FOR A PLURALITY OF HANDWRITTEN CHARACTER PATTERNS--.

Signed and Sealed this

Ninth Day of February, 1999

Attest:

Attesting Officer

*Acting Commissioner of Patents and Trademarks*